United States Patent [19]

Paton

[11] Patent Number: 4,886,255

[45] Date of Patent: Dec. 12, 1989

[54] SUSPENSION STRUT WITH SELECTIVELY CONTROLLABLE DIFFERENTIAL REBOUND AND JOUNCE DAMPING

[76] Inventor: H. Neil Paton, 1218 Third Ave., Ste. 1018, Seattle, Wash. 98101

[21] Appl. No.: 54,539

[22] Filed: May 27, 1987

[51] Int. Cl.[4] .............................................. F16F 7/08
[52] U.S. Cl. .................................. 267/205; 267/207; 267/197; 267/33; 267/219
[58] Field of Search ............... 267/201, 202, 196, 205, 267/207, 214, 33, 35, 219, 203, 134, 135, 195, 198, 220, 141.7, 197; 188/129, 381, 268, 322.15, 322.18

[56] References Cited

U.S. PATENT DOCUMENTS

| | | | |
|---|---|---|---|
| 374,080 | 11/1887 | Nickerson | 188/322.18 |
| 1,598,228 | 8/1926 | Wikander | 267/207 |
| 2,056,106 | 9/1936 | Kuhn | 267/35 |
| 2,179,959 | 11/1939 | Schroedter | 188/268 |
| 2,237,318 | 4/1941 | Snyder | 267/207 |
| 2,819,060 | 1/1958 | Neidhart | 267/153 |
| 2,819,063 | 1/1958 | Neidhart | 267/292 |
| 3,700,225 | 10/1972 | Fader et al. | 267/35 |
| 4,256,292 | 3/1981 | Sullivan, Jr. et al. | 267/220 |
| 4,415,146 | 11/1983 | Sitko | 267/96 |
| 4,473,216 | 9/1984 | Paton et al. | 267/202 |
| 4,475,722 | 10/1984 | Paton et al. | 267/202 |
| 4,606,442 | 8/1986 | Paton et al. | 188/381 |
| 4,613,114 | 9/1986 | Paton | 267/202 |
| 4,635,909 | 1/1987 | Gold | 188/322.15 |

FOREIGN PATENT DOCUMENTS

| | | | |
|---|---|---|---|
| 58043 | 8/1982 | European Pat. Off. | |
| 850684 | 9/1952 | Fed. Rep. of Germany | |
| 1133953 | 4/1957 | France | 267/207 |
| 57-33008 | 2/1982 | Japan | |
| 58-118344 | 7/1983 | Japan | |
| 59-40040 | 3/1984 | Japan | |
| 1284536 | 8/1972 | United Kingdom | 267/205 |

OTHER PUBLICATIONS

Rowland, "Suspension Simplicity from Paton", Automotive News, Jul. 28, 1986, at 32.

The Paton Corp., "The Electronic Suspension Revolution and the Paton Dry-Namic ® (Non-Hydraulic) Suspensions", Jun. 1986.

Primary Examiner—Andres Kashnikow
Assistant Examiner—Mark T. Le
Attorney, Agent, or Firm—Finnegan, Henderson, Farabow, Garrett & Dunner

[57] ABSTRACT

The strut includes a bidirectional frictional damping assembly which provides frictional damping under rebound and jounce conditions. A separate rebound frictional damping assembly, or a separate jounce frictional damping assembly, or both, provide differential rebound and jounce damping, with and without bidirectional frictional damping.

20 Claims, 1 Drawing Sheet

SUSPENSION STRUT WITH SELECTIVELY CONTROLLABLE DIFFERENTIAL REBOUND AND JOUNCE DAMPING

BACKGROUND OF THE INVENTION

This invention relates to suspension struts and, more particularly, to frictionally damped suspension struts. While one presently preferred embodiment of the invention is disclosed herein for application to suspension struts such as those used to support the cab on certain types of heavy trucks, the invention is not limited to such applications and may be used with other types of suspensions and vehicles, including without limitation as the front and/or rear suspensions of lightweight passenger vehicles, and in other applications.

Frictionally damped suspension struts, such as that disclosed in U.S. Pat. No. 4,475,722 and 4,473,216, are suitable for providing differential jounce and rebound damping forces. That is, the frictional damping force obtained during compression of the strut under jounce conditions may be different in magnitude than the frictional damping force obtained during extension of the strut under rebound conditions. Indeed, these struts typically provide a frictional damping force which is greater during rebound conditions than jounce conditions. In the struts disclosed in the aforesaid United States Patents, this is accomplished by the provision of different wedge angles on the damper wedges and their associated upper and lower wedge rings. In some practical applications, however, the differential between the frictional damping forces obtained during jounce and rebound conditions is insufficient to provide satisfactory ride characteristics.

SUMMARY OF THE INVENTION

An object of this invention is to provide a frictionally damped suspension strut having selectively controllable, differential rebound and jounce damping.

Another object of this invention is to provide a frictionally damped suspension strut in which the frictional damping force provided under either rebound or jounce conditions, or both, is obtained from one or more sources, which together provide the frictional damping force desired under rebound or jounce conditions, as the case may be.

To achieve these objects, and in accordance with the principles of this invention, this invention provides a frictionally damped suspension strut comprising a telescopic load bearing assembly which is made up of two telescopecally movable load bearing members. A bidirectional frictional damping assembly is supported by the first, or outer, load bearing member for applying a first frictional damping force to the second, or inner, load bearing member in response to contraction of the first and second load bearing members under jounce conditions. In addition, this damping assembly provides a second frictional damping force which is applied to the second load bearing member in response to extension to the first and second load bearing members under rebound conditions. A rebound damping assembly is supported by the second, or inner, load bearing member and is operative for applying an additional frictional damping force to the first load bearing member, but essentially only in response to extension of the first and second load bearing members under rebound conditions. As a consequence, the frictional damping forces applied by the bidirectional frictional damping assembly and the rebound damping assembly just described are applied cumulatively under rebound conditions. The total frictional damping force thus obtained under rebound conditions corresponds to the sum of these forces.

According to further principles of this invention, a jounce damping assembly may be provided for applying an additional frictional damping force to the second load bearing member, but essentially only in response to contraction to the first and second load bearing members under jounce conditions. As a consequence, the frictional damping forces applied by the bidirectional frictional damping assembly and the jounce damping assembly just mentioned are applied cumulatively under jounce conditions. The total frictional damping force thus obtained under jounce conditions corresponds to the sum of these forces. The jounce damping assembly may be provided in addition to, or in lieu of, the aforementioned rebound damping assembly, depending upon the requirements of the specific application involved.

Thus, as will be appreciated from the foregoing summary, this invention provides differential rebound and jounce damping which results from the cumulative effects of the rebound and/or jounce damping assemblies, with or without the frictional damping obtained by the bidirectional frictional damping assembly typically used in prior frictionally damped suspension struts. This invention therefore may provide essentially only rebound damping, essentially only jounce damping, or both rebound and jounce damping, depending upon the differential between rebound and jounce damping necessary to accomplish satisfactory ride characteristics. For the first time, this differential is controllable by appropriate selection of the bidirectional, rebound and jounce damping assemblies, either singularly or in combination.

These and other features, objects, and advantages of the present invention will become apparent from the detailed description and claims to follow, taken in conjunction with the accompanying drawings, in which like parts bear like reference numerals.

DETAILED DESCRIPTION OF THE DRAWING

Figure 1:
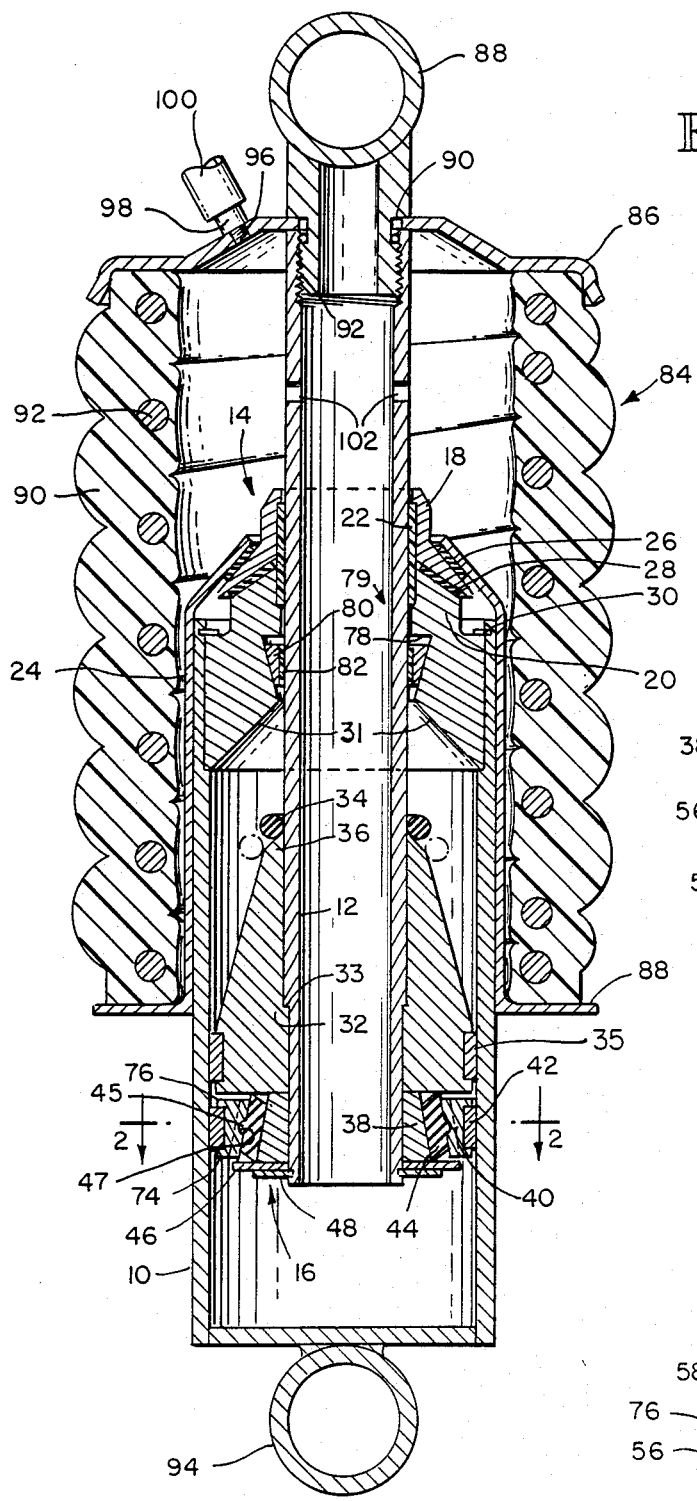
FIG. 1 is a longitudinal section of one presently preferred embodiment of the suspension strut of this invention.
Figure 2:
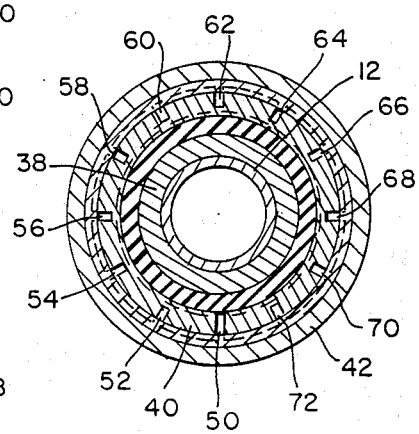
FIG. 2 is a section taken along the line 2—2 in FIG. 1.
Figure 3:
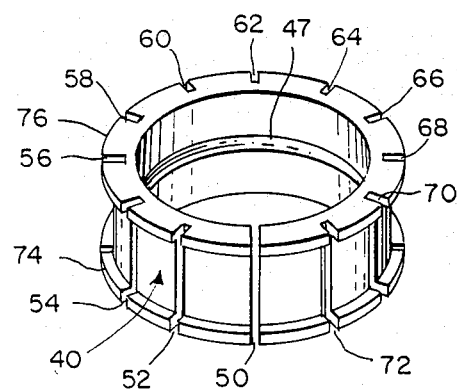
FIG. 3 is a perspective of the damping ring which makes up part of the rebound damping assembly of the FIG. 1 strut.

One presently preferred embodiment of the present invention suitable for use as a cab mount strut is illustrated in FIGS. 1-3. Referring to FIG. 1, this strut comprises a telescoping load bearing assembly made up of two telescopically movable load bearing members, an outer tubular load bearing member 10, and an inner tubular load bearing member 12 telescopically movable within member 10. In the example illustrated, members 10 and 12 are of circular cross-sections. A bidirectional damping assembly (generally referenced by numeral 14) is supported by the inner end of member 10. Assembly 14 applies a first frictional damping force to the outer surface of member 12 in response to contraction of members 10 and 12 under jounce conditions. In addition, assembly 14 applies a second frictional damping force to the same surface of member 12 in response to extension of members 10 and 12 under rebound conditions. In the example, the frictional damping force applied during rebound conditions is greater than that applied during jounce conditions. The construction and manner by which this is accomplished will be described presently.

A rebound damping assembly (generally referenced by numeral 16) is supported by the inner end of member 12. (This is the lower end of member 12 as illustrated in FIG. 1). Assembly 16 applies a frictional damping force to the inner surface of member 10 in response to extension of members 10 and 12 under rebound conditions. Except for a small residual force, the nature of which will be described presently, assembly 16 is not operative to apply a frictional damping force to member 10 in response to contraction to members 10 and 12 under jounce conditions. As a consequence, the strut illustrated in FIG. 1 produces a cumulative frictional damping force under rebound conditions which, in the example, corresponds to the sum of the frictional damping forces applied by assembly 14 and assembly 16. As will be described presently, assembly 14 is load responsive, while assembly 16 is velocity responsive. Consequently, the frictional damping forces applied vary both in accordance with the load applied to members 10 and 12, and the velocity with which they move under rebound and jounce conditions.

With specific reference to the bidirectional damping assembly 14 depicted in FIG. 1, this assembly is made up of an upper wedge ring 18, a lower wedge ring 20, and a combination damper and bearing element 22. Element 22 normally acts as a sleeve bearing to facilitate low friction extension and contraction of members 10 and 12. When an axial load is applied to the strut, however, an axial force is applied to the upper wedge ring 18 by the tapered, inner end of a generally tubular spring carrier 24, causing the upper wedge ring 18 to press element 22 against the outer surface of member 12. As a consequence, a frictional damping force is applied to member 12, thus resisting extension and contraction of the load bearing assembly under rebound and jounce conditions, respectively. The frictional damping forces applied are proportional to the axial load applied to members 10 and 12. This load is transmitted by spring carrier 24 from a composite spring 84, to be described presently, to the upper wedge ring 18. The frictional damping forces applied are further controllable by appropriate selection of the wedge angles of rings 18 and 20 with respect to the longitudinal axis of the strut. While preferably two layers of elastomer 26 and 28 are interposed between the upper and lower wedge faces of the upper wedge ring 18 and the opposing faces of spring carrier 24 and the lower wedge ring 20, respectively, one or both of these interfaces may be formed by direct contact between these members. It is believed that the provision of such elastomer layers increases the sensitivity of the strut to certain high frequency force inputs by providing essentially frictionless movement of the upper wedge ring 18 with respect to the element 22.

In the example, the upper wedge ring 18 is split and may include exterior slots (not shown) to promote radial flexibility with respect to, and hence uniform contact with, element 20. This tends to increase the contact area of element 20 with member 12 when it is pressed against member 12, thereby enhancing the frictional damping forces obtained. The lower wedge ring 20, however, is not split, and is press set into a cylindrical relief cut formed in the inner end of member 12. It is fixed in this position by a retaining ring 30 which projects into and is resiliently engageable by a circumferential slot formed adjacent the inner end of member 12. The outer end of the lower wedge ring 20 is inclined at the prescribed wedge angle and bears against the upper wedge ring 18 as just described. The inner end of the lower wedge ring 20 forms a conical surface 31 which is inclined with respect to the longitudinal strut axis.

With further reference to FIG. 1, a rebound carrier 32 is interposed between assembly 14 and assembly 16. Carrier 32 has a generally tapered outline and an inner stepped bore which registers with the outline of member 12. This bore forms a positioning shoulder 33 which is spaced from he inner end of carrier 32 a distance corresponding to the spacing of a conforming shoulder formed by the terminus of a relief surface formed by the outer end of member 12. When rebound carrier 32 is inserted onto the outer end of member 12, these shoulders engage one another and hence position rebound carrier 32. A sleeve bearing 35 is supported by the outer end of the rebound carrier and bears against the inner surface of member 10. Like element 22, bearing 35 is composed of a suitable low friction material which will promote low friction telescopic movement of members 10 and 12.

An elastomeric ring 34 is stretched about member 12 and is normally positioned adjacent the inner end of carrier 32, fronting upon its tapered inner end 36. As the load bearing assembly nears its fully extended rebound position, ring 34 engages end 36 and is squeezed between it and the surface 31. As a conseqence, ring 34 is stretched about and rolled in an outward direction about end 36 until reaching a position at which it is wedged between surface 31 and rebound carrier 32, as depicted by broken lines in FIG. 1. Thus it is possible, by providing such selective stretching and rolling of ring 34, to provide for a progressively increasing rebound cushioning rebound force, which resists and eventually stops extension of members 10 and 12 as they near and finally reach their rebound position. In addition, axial load applied to the strut under this condition appears as a radial load on the rebound carrier 32.

With reference to FIGS. 1-3, the rebound damping assembly 16 is made up of an inner wedge ring 38 which has an outer wedge face inclined with respect to the longitudinal strut axis from the outer end of member 12. The inner surface of ring 38 registers with the outline of member 12. The inner edge of ring 38 abuts against and is positioned axially by the outer end of rebound carrier 32. A damping ring 40 is carried by wedge ring 38 and supports an annular friction pad 42 which normally bears against the inner surface of load member 10. Ring 40 has an inner, inclined wedge face which is face-to-face with and surrounds the outer wedge face of ring 38. A layer of elastomer 44 may be interposed between these opposed wedge faces to facilitate essentially frictionless movement of, and hence increase sensitivity of the rebound damper in the same manner as the elastomer layers which make up part of assembly 14. As depicted in FIG. 1, layer 44 includes an outwardly facing shoulder 45 which projects into, and is compressed within, a recess 47 formed in the inner wedge face of ring 40. Since it is thus compressed, shoulder 45 continuously urges ring 40 and hence pad 42 outwardly so that pad 42 normally tends to remain in sliding contact with member 10, as shown (FIG. 1).

The outer edge of ring 38 rests upon and is retained by an annular thrust bearing 46 which, in turn, is held in position by a stop washer 48. Washer 48 is engaged with and projects outwardly from a slot formed adjacent the outer end of member 12, as shown (FIG. 1). In the example illustrated in FIG. 1, the edges of rings 38 and 40, as well as those of layer 44, are spaced from bearing 46 and the outer end of rebound carrier 32. In addition, the edges of layer 44 are inclined with respect to bearing 46 and rebound carrier 32. This spacing provides clearance for layer 44 to stretch in shear so that ring 40 can shift axially in an outward direction with respect to ring 38 during extension of members 10 and 12.

With specific reference to FIGS. 2 and 3, the damping ring 40 should be sufficiently flexible so that it can expand uniformly and hence produce continuous contact between pad 42 and member 10. In the example, this is accomplished by forming ring 40 with a split at 50 and eleven equally spaced apart slots 52, 54, 56, 58, 60, 62, 64, 66, 68, 70, and 72 in its outer surface, as shown (FIG. 3). The number and spacing of these slots, of course, may vary, depending on the rebound force desired. Ring 40 also includes two spaced apart parallel, annular shoulders 74 and 76 (FIG. 3), between which pad 42 is positioned and retained. It will be recognized that, to enhance its expandability, ring 40 can be made up of two, three, four or more arcuate segments, instead of the single split ring construction illustrated. In such a segmented construction, wedge ring 38 and layer 44 would be made up of corresponding segments. The construction of pad 42, however, would remain unchanged.

As members 10 and 12 extend under rebound conditions, during which member 12 moves in an upward direction as illustrated in FIG. 1, ring 38 wedges against and expands ring 40 in a radially outward direction. Ring 40 thus presses pad 42 against the inner surface of member 10. When member 12 moves in the opposite direction under jounce conditions, however, this does not occur because of the inclinations of the interactive wedge faces of rings 38 and 40. In most practical cases, however, pad 42 tends to remain in sliding contact with member 10, so a small frictional damping force will be applied to member 10 even under jounce conditions. Since the frictional damping force applied to member 10 during extension of members 10 and 12 under rebound conditions is, by comparison, much larger in magnitude than this residual force, however, the rebound damping assembly 16 is essentially unidirectional. That is, it applies a frictional damping force to member 10 essentially only under rebound conditions. As will now be appreciated, the bidirectional damping assembly simultaneously applies a frictional damping force to member 12 under such conditions. The rebound damping force thus obtained corresponds to the sum of the frictional damping forces applied by assembly 14 and assembly 16 under such conditions.

The rebound damping assembly 16 is velocity responsive, not load responsive. Referring again to FIG. 1, the interface friction between pad 42 and member 10 is sufficiently greater than the shear resistance of layer 44 that layer 44 is compressed and moved in shear during extension of members 10 and 12. Layer 44 thus provides a lost-motion connection between ring 38 and ring 40. In the example illustrated in FIG. 1, layer 44 is depicted in its initial lost-motion position, as reflected by its parallelogram profile, from which lost-motion occurs in response to extension of members 10 and 12. The lost-motion capacity of layer 44 is exceeded when it is compressed and moved in shear so that at maximum travel, its lower end abuts against and is retained from further deflection by bearing 46. Within the limits of this lost-motion, pad 42 and ring 40 are shifted axially with member 10 in an essentially conjoint manner, while layer 44 is compressed and moved in shear, between rings 38 and 44, from its FIG. 1 position. During this interval, layer 44 absorbs some or all of the outward force exerted by ring 38. Once layer 44 is compressed against bearing 46, however, the wedging action of ring 38 is no longer abated by the lost-motion effects of layer 44. Thereafter, the frictional damping force obtained increases in proportion of the wedge angle of ring 38. These lost-motion effects, of course, dissipate more rapidly as the extension velocity of members 10 and 12 increases.

Consequently, application of the full frictional damping force obtainable from the rebound assembly 16 under rebound conditions is delayed in relation to the extension velocity. The greater the extension velocity, the more rapidly the full frictional damping force is applied, and vice versa. Since the bidirectional frictional damping assembly 14 acts continuously, so long as there is a load applied to the strut, the bidirectional and rebound damping assemblies 14 and 16 therefore tend to operate sequentially. Assembly 16 supplements the then-existing frictional damping force applied by assembly 14 under those rebound conditions which cause the lost-motion capacity of layer 44 to be exceeded. The duration of the interval before which both assemblies operate simultaneously and hence the cumulative effects of both assemblies are obtained, is likewise dependent upon the lost-motion capacity of layer 44. Thus, it is possible, by appropriate selection of layer 44, to control the sensitivity of assembly 16, and hence of the strut, to the extension velocity of members 10 and 12 under rebound conditions. In some suspension applications, this tends to provide a preferred ride.

Referring again to FIG. 1, the strut of this invention also provides jounce-only unidirectional differential damping in addition to or in lieu of such rebound-only unidirectional damping. To this end, a jounce damping assembly (generally referenced by numeral 79) may be provided. Assembly 79 is supported within an annular recess 78 formed by the lower wedge ring 14. Recess 78 has an inwardly facing wedge face which is inclined oppositely to that of ring 38. A wedge ring 80 is positioned within recess 78 and has an inclined wedge face which is in face-to-face contact with a bears upon this wedge face. The opposite face of ring 80 supports an annular friction pad 82 which bears against the outer surface of member 12. An elastomer layer (not shown) generally similar to layer 44 may be interposed between ring 80 and the wedge face to recess 78. If so, this layer, like layer 44, urges ring 80 and hance pad 82 in an inward direction so that pad 82 normally tends to remain in sliding contact with member 12, as shown (FIG. 1).

During contraction of members 10 and 12 under jounce conditions, ring 80 is wedged against and contracts pad 82 in a radially inward direction. Ring 80 thus presses pad 82 against the outer surface of member 12, causing a frictional damping force to be applied to member 12. When member 12 moves in the opposite direction under rebound condition, this does not occur because of the inclinations of the interactive wedge faces of rings 20 and 80. Like the rebound damping assembly, however, pad 82 tends to remain in contact with member 12, so a small frictional damping force will be applied to member 12 even under rebound conditions. Since the frictional damping force applied to member 12 during compression of members 10 and 12 under jounce conditions is, by comparison, much larger in magnitude than this residual force, however, the jounce damping assembly is essentially unidirectional. That is, it applies a frictional damping force to member 12 essentially only under jounce conditions. As will now be appreciated, the bidirectional damping assembly simultaneously applies a frictional damping force to member 12 under such conditions. The jounce damping thus obtained corresponds to the sum of the frictional damping forces applied by assembly 14 and assembly 79 under such conditions. With the provision of an elastomer layer generally similar to layer 44, as just described, assembly 79 also includes a lost-motion capacity and so is velocity responsive to the same extent as assembly 16, except under jounce conditions. In addition, assembly 79 and the bidirectional frictional damping assembly 14, likewise tend to operate sequentially under jounce conditions.

One presently preferred embodiment of the strut of this invention further includes a composite spring (generally referenced by numeral 84) which is compressed between two opposed spring seats, a fixed spring seat 86 and a a movable spring seat 88. The latter is formed by a transverse annular flange which projects outwardly from the outer end of the spring carrier 24. The inner surface of the spring carrier 24 and the outer surface of member 10 are slidably engaged in face-to-face contact. To permit rotative and longitudinal movement between these surfaces, one or both surfaces may be coated with an appropriate low friction material. Spring 84 is made up of a tubular elastomeric body 90 and a coil spring 92, embedded in body 90. Preferably, the ends of body 90 and seats 86 and 88 respectively form suitable pressure seals, so that the interior of the spring can be pressurized as will be described presently. In addition, these seals should provide suitable moisture seals to prevent the entry of moistrue into the interior of the strut.

Seat 86 has a generally circular plan profile and a protruding mid-section. The outer edge of seat 86 forms a flange which overlaps and retains the upper edge of spring 84. An upper cab-mount connector 88 is threadably engageable with interior threads formed in the outer end of member 12. Connector 88 includes an annular shoulder 90 which faces the inner terminus of a male threaded portion 92. This shoulder bears upon and secures the inner edge of seat 86 when connector 88 is screwed into and tightened down in member 12, as shown (FIG. 1). A second cab mount connector 94 is secured to the outer end of member 10. Connectors 88 and 94 are respectively securable to a truck cab and a truck chassis, or vise versa.

The interior of the FIG. 1 strut may be pressurized so as to cause it to act to some degree as an air spring. To this end, seat 86 includes a port 96 which is suitably threaded for engagement with a fitting 98. This fitting communicates with an air line 100 which in turn is connected with a source of pressurized air (not shown). The inner load bearing member likewise includes one or more air passages 102 through which air admitted through fitting 98 may flow so as to maintain equal pressure throughout the interior of the strut. As will be appreciated, the interior of the strut, which generally is bounded by spring 84 and bearing 10, forms a variable volume chamber. The volume of this chamber of course is variable in relation to extension and contraction of members 10 and 12. Thus it is possible, by thus pressurizing this chamber, to control the air pressure within this chamber and thus supplement the resistance of the load bearing assembly to compression under jounce conditions. In addition, it is likewise possible to vary the length of the strut by selectively pressurizing this chamber so that the strut normally assumes a desired extended or contracted position under a predetermined axial load. This permits, for example, the selective setting of a cab height in accordance with the prescribed internal pressure.

While one presently preferred embodiment of this invention has been illustrated and described herein, variations will become apparent to one of ordinary skill in the art. For example, in some applications where no bidirectional damping is required, only the rebound damping assembly or only the jounce damping assembly could be used, as the case may be. Accordingly, the invention is not to be limited to the specific embodiment illustrated and described herein, and the true scope and spirit of the invention are to be determined by reference to the appended claims.

The embodiments of this invention in which an exclusive property or privledge is claimed are defined as follows:

1. A frictionally damped suspension strut, comprising:
   a first load bearing member;
   a second load bearing member telescopically movable within said first load bearing member;
   a load responsive bidirectional damping assembly supported by said first load bearing member, and comprising first damping means for applying a first frictional damping force to said second load bearing member continuously during contraction of said first and second load bearing members under jounce conditions, and for applying a second frictional damping force to said second load bearing member continuously during extension of said first and second load bearing members under rebound conditions, said first and second frictional damping forces being proportional to the loads applied to said first and second load bearing members under jounce and rebound conditions, respectively; and
   a velocity responsive rebound damping assembly supported by said second load bearing member, and comprising second damping means for applying a third frictional damping force to said first load bearing member essentially only in response to extension of said first and second load bearing members under rebound conditions, and then after a lost-motion interval which is (i) shorter as said extension velocity increases and (ii) longer as said extension velocity decreases,
   said second damping means comprising lost-motion control means including a precompressed elastomer member which is deflectable in shear, in a direction parallel to the direction of travel of said first and second load bearing members, during said lost-motion interval, and means forming a space providing clearance along said direction of travel sufficient to permit said elastomer member to deflect in shear until said first and second load bearing members have moved a certain distance of travel, whereby the frictional damping force obtained under rebound conditions initially consists of said second frictional damping force and then comprises the sum of said second frictional damping force and said third frictional damping force.

2. The strut of claim 1, wherein said first and second load bearing members each includes an inner end and an outer end, and wherein said bidirectional damping assembly is supported adjacent the inner end of said first load bearing member, and said rebound damping assembly is supported adjacent the inner end of said second load bearing member.

3. The strut of claim 2, wherein said second damping means include wedge ring means mounted by the inner end of said second load bearing member and expandable damping means in frictional engagement with said first load bearing member, and wherein said elastomer member is interposed between said wedge ring means and said expandable damping means, said wedge ring means being so inclined with respect to the direction of travel of said first and second load bearing members that it expands said expandable damping means and thereby urges said expandable damping means against said first load bearing member essentially only during extension of said first and second load bearing members under rebound conditions.

4. The strut of claim 3, wherein said expandable damping means comprises a split ring having a plurality of slots formed in its outer surface and two spaced apart parallel annular shoulders projecting outward from said outer surface, and an annular friction pad supported by said split ring between said annular shoulders.

5. The strut of claim 3, wherein said wedge ring means is a wedge ring having an inner bore which registers with the outline of the inner end of said second load bearing member and wherein said lost-motion control means include stop means projecting outwardly from the inner end of said second load bearing member for holding said wedge ring in a fixed position thereon during extension of said first and second load bearing members and for limiting shear deflection of said elastomer layer under rebound conditions.

6. The strut of claim 5, wherein said stop means include a stop washer which is detachably mounted by the inner end of said second load bearing member.

7. The strut of claim 5, further comprising a rebound carrier having a bore which registers with the outline of the inner end of said second load bearing member, said rebound carrier having one end in engagement with said wedge ring, and wherein said stop means are further operative for holding said rebound carrier and said wedge ring in fixed end-to-end relation.

8. The strut of claim 7, wherein said rebound carrier further includes a tapered end, and further comprising an elastomeric rebound stop ring stretched about said second load bearing member adjacent said tapered end, and means supported by said first load bearing member for rolling said rebound stop ring along, and stretching it about, said tapered end as said first and second load bearing members near their fully extended rebound position.

9. The strut of claim 1, further comprising a velocity responsive jounce assembly supported by said first load bearing member, and comprising third damping means for applying a fourth frictional damping force to said second load bearing member in response to contraction of said first and second load bearing members under jounce conditions, and then after a second lost-motion interval which is (i) shorter as said contraction velocity increases and (ii) longer as said contraction velocity decreases, said third damping means comprising second lost-motion control means including a second precompressed elastomer member which is deflectable in shear, in a direction parallel to the direction of travel of said first and second load bearing members, during said lost-motion interval, and means forming a second space providing clearance along said direction of travel sufficient to permit said second elastomer member to deflect in shear until said first and second load bearing members have contracted a certain second distance of travel, whereby the frictional damping force obtained under jounce conditions initially consists of said first frictional damping force and then comprises the sum of said first frictional damping force and said fourth frictional damping force.

10. The strut of claim 9, wherein said third damping means include contractable damping means supported by said second load bearing member.

11. The strut of claim 1, further comprising a tubular elastomeric spring having two ends, mounting means operatively associated with said first and second load bearing members for supporting and sealing the ends of said spring so as to form a chamber, and means for pressurizing said chamber.

12. A frictionally damped suspension, comprising:
a first load bearing member;
a second load bearing member telescopically movable within said first load bearing member, and
a velocity responsive rebound damping assembly comprising damping means supported by one of said load bearing members for applying a frictional damping force to the other of said load bearing members essentially only during extension of sad first and second load bearing members under rebound conditions, and then after a lost-motion interval which is (i) shorter as said extension velocity increases and (ii) longer as said extension velocity decreases,
said damping means comprising lost-motion control means including a precompressed elastomer member which is deflectable in shear, in a direction parallel to the direction of travel of said first and second load bearing members, during said lost-motion interval, and means forming a space providing clearance along said direction of travel sufficient to permit said elastomer member to deflect in shear until said first and second load bearing members have moved a certain distance of travel.

13. The suspension of claim 12, wherein said rebound damping assembly are supported adjacent the inner end of said second load bearing member.

14. The suspension of claim 13, wherein said damping means include wedge ring means mounted adjacent the inner end of said second load bearing member and expandable damping means in frictional engagement with said first load bearing member, and wherein said elastomer member is interposed between said wedge ring means and said expandable damping means, said wedge ring means being so inclined with respect to the direction of travel of said first and second load bearing members that it expands said expandable damping means and thereby urges said expandable damping means against said first load bearing member essentially only during extension of said first and second load bearing members under rebound conditions.

15. The suspension of claim 14, wherein said expandable damping means comprises a split ring having a plurality of slots formed in its outer surface, and two spaced apart parallel annular shoulders projecting outward from said outer surface, and an annular friction pad supported by said split ring between said annular shoulders.

16. The suspension of claim 14, wherein said wedge ring means is a wedge ring having an inner bore which registers with the outline of the inner end of said second load bearing member and wherein said lost-motion control means include stop means projecting outwardly from the inner end of said second load bearing member for holding said wedge ring in a fixed position thereon during extension of said first and second load bearing members and for limiting shear deflection of said elastomer layer under rebound conditions.

17. The suspension of claim 16, wherein said stop means include a stop washer which is detachably mounted by the inner end of said second load bearing member.

18. The suspension of claim 16, further comprising a rebound carrier having a bore which registers with the outline of the inner end of said second load bearing member, said rebound carrier having one end in engagement with said wedge ring, and wherein said stop means are further operative for holding said rebound carrier and said wedge ring in fixed end-to-end relation.

19. The suspension of claim 18, wherein said rebound carrier further includes a tapered end, and further comprising an elastomeric rebound stop ring stretched about said second load bearing member adjacent said tapered end, and means supported by said first load bearing member for rolling said rebound stop ring along, and stretching it about, said tapered end as said first and second load bearing members near their fully extended rebound position.

20. A frictionally damped suspension, comprising:
   a first load bearing member;
   a second load bearing member telescopically movable within said first load bearing member; and
   a velocity responsive jounce damping assembly comprising damping means supported by said first load bearing members for applying a frictional damping force to said second load bearing members essentially only during contraction of said first and second load bearing members under jounce conditions, and then after a lost-motion interval which is (i) shorter as said contraction velocity increases and (ii) longer as said contraction and velocity decreases, said damping means comprising lost-motion control means including a precompressed elastomer member which is deflectable in shear, in a direction parallel to the direction of travel of said first and second load bearing members, during, said lost-motion interval, and means forming a space providing clearance along said direction of travel sufficient to permit said elastomer member to deflect in shear until said first and second load bearing members have contracted a certain distance of travel.

* * * * *

UNITED STATES PATENT AND TRADEMARK OFFICE
CERTIFICATE OF CORRECTION

PATENT NO. : 4,886,255

DATED : December 12, 1989

INVENTOR(S) : H. Neil Paton

It is certified that error appears in the above-identified patent and that said Letters Patent is hereby corrected as shown below:

IN THE CLAIMS:

Claim 12, column 10, (9th line of claim) line 35: "sad" should be --said--.

Signed and Sealed this

Sixth Day of August, 1991

Attest:

Attesting Officer

HARRY F. MANBECK, JR.

Commissioner of Patents and Trademarks